US007451968B2

(12) United States Patent
Geldert

(10) Patent No.: US 7,451,968 B2
(45) Date of Patent: Nov. 18, 2008

(54) RACK FOR SECURING A VARIETY OF OBJECTS FOR A VARIETY OF PURPOSES

(76) Inventor: Jason Geldert, 7048 Snapdragon, Carlsbad, CA (US) 92009

( * ) Notice: Subject to any disclaimer, the term of this patent is extended or adjusted under 35 U.S.C. 154(b) by 167 days.

(21) Appl. No.: 11/233,608

(22) Filed: Sep. 23, 2005

(65) Prior Publication Data

US 2006/0012096 A1 Jan. 19, 2006

(51) Int. Cl.
*B25B 1/24* (2006.01)

(52) U.S. Cl. .......................... 269/258; 269/261; 269/43

(58) Field of Classification Search ................. 269/258, 269/43, 71, 203, 271, 259, 260
See application file for complete search history.

(56) References Cited

U.S. PATENT DOCUMENTS

| | | | | | |
|---|---|---|---|---|---|
| 4,717,132 | A | * | 1/1988 | Yang | 269/261 |
| 4,969,638 | A | * | 11/1990 | Yang | 269/261 |
| 6,152,435 | A | * | 11/2000 | Snell | 269/43 |
| 6,431,534 | B1 | * | 8/2002 | Orosz et al. | 269/43 |
| 2002/0109282 | A1 | * | 8/2002 | Peck | 269/258 |
| 2006/0012096 | A1 | * | 1/2006 | Geldert | 269/203 |

* cited by examiner

*Primary Examiner*—Lee D Wilson
(74) *Attorney, Agent, or Firm*—Steven W. Webb

(57) ABSTRACT

This invention relates to racks for securely holding a variety of objects. The racks are easily mounted in the horizontal, vertical and/or diagonal positions. Moreover, the racks will rigidly hold objects of varying thickness without complicated adjustments of the contact surface area.

13 Claims, 6 Drawing Sheets

RACK FOR SECURING A VARIETY OF OBJECTS FOR A VARIETY OF PURPOSES

RELATED U.S. APPLICATIONS

This application supplements and completes PCT Provisional Application PCT/US2004/009124, filed Mar. 24, 2004.

BACKGROUND OF THE INVENTION

Racks are commonly used for securing objects for transportation, storage, and/or display reasons. It is also desirable to provide a mechanism for locking objects within these racks, thereby preventing any unauthorized removal of the objects from the racks.

One common use of a rack is to bind sporting equipment to an object such as a vehicle, a wall in a house or garage, or a store display rack. When a rack is used in conjunction with a vehicle, the main purpose is transportation of said object, whereas, when a rack is attached to a wall or display structure, the main purpose is storage and/or display. In either instance, the goal of the rack is to firmly support the object in a desired position.

Various forms of vehicle carriers heretofore have been provided for supporting and carrying objects on a vehicle. The typical method for supporting sporting equipment such as surfboards, sailboards, kayaks and the like, involves using canvas or rubber straps. For example, U.S. Pat. No. 4,007,862 issued to Heftmann and entitled Car Rack for Holding Surfboards and the Like, and U.S. Pat. No. 6,199,412 issued to Kennedy and entitled Lockable Tie Down Strap, both disclose a rack utilizing straps which are placed across the object to be supported within the rack. The straps are pulled tight, thereby securing the object within the rack. The straps may then be locked to prevent any unauthorized removal of the object from the rack. Although this is the most typical method of securing an object within a rack, there are obvious drawbacks. The flexible properties of strap-based systems are subject to wear and tear and weathering, which in time will result in the breaking of the straps. In addition, straps are easily unhooked, resulting in theft of the object. Even with a lock incorporated into the strap system, the straps are easily cut and the object removed.

More secure strap based systems have been disclosed. For example, in U.S. Patent Application No. 2001/0031588 A1 entitled Board Securing Device, the inventor discloses a device comprising a flexible cable loop strap that is engage able using a key or combination operated lock. The loop is placed around the circumference of a surfboard at a location proximate a rack mounting bar. The loop is then secured to the rack mounting bar, thus securing the board to the rack mounting bar. The disclosed loop offers a locking mechanism that is neither subject to the same degree of deterioration as are standard straps nor easily cut. However, the loop straps do not form part of the rack system. Instead, the loop straps are a time consuming addition to an existing rack system, offering no legitimate support between the object and the rack.

U.S. Pat. No. 5,582,044, issued to Bolich and entitled Adjustable Surfboard Clamp and Method, discloses a method for locking a surfboard to a roof rack crossbar using a series of adjustable mount block assemblies affixed to the rack crossbars at a lateral position of contact with the sides of a surfboard placed horizontally on top of the crossbars. The mount block assemblies utilize a metal clamp that is vertically adjusted to the thickness of the surfboard at the lateral position of contact. An internal axle connects two side cams vertically adjacent to a center mount block with the clamp affixed within the side cams. An axle allows for the clamp assemblies to open and close by means of rotation of the side cams relative to the position of the mount block. The mount block assemblies utilize a lock pin that inserts through an alignment of holes in the mount block assembly to a position of engagement with a cam lock assembly. Utility of the cam lock serves to prevent or allow removal of the lock pin. This clamping method prevents movement of a surfboard on the crossbar and deters theft.

While the mounting block based assembly of U.S. Pat. No. 5,582,044 forms an integral part of the rack assembly, use of the disclosed mounting block is complex. A user must determine through tedious trial and error, the optimal setting of the clamp with respect to the side cams for each board secured within the rack. Readjustment of the clamp requires that the user rotate the side cams, release an internal set screw, guestimate a proper setting of the clamp, and return the side cam to the "secure" position. If the clamp has been adjusted too short, the clamp will not fit over the board. If the clamp has been adjusted too high, there will be excess space between the board and the clamp. Neither are desirable settings, thus requiring a repeat of the process until an "optimal fit" is achieved. Furthermore, the clamp mechanism is designed such that the clamp face runs parallel with the longitudinal centerline of the vehicle, to which it is attached. Surfboards, as is the case with most sporting equipment, have a nonlinear outline. This being the case, the face of the clamp is not able to form full contact with the surfboard. Contact is limited to point contact between a corner of the clamp, which is a small surface area, and the surfboard rail. Such contact on the fragile rails of a surfboard will damage the rails. This damage is exacerbated by vibration of the surfboard in transit when the "optimal fit" is not a snug fit between the clamp and surfboard.

Thus there is a need in the art for a locking rack that will securely and snugly hold a variety of sized objects without using fragile straps, without requiring complex adjustments of the rack members and without damaging the objects at the point of contact.

BRIEF SUMMARY OF THE INVENTION

The current disclosure relates to a vice system useful for holding a variety of sized objects without adjusting the contact surface area. The vice face, when placed in contact with an object, forms snug, flush, secure and releasably lockable contact with an object. Said vices are applicable to vehicle transportation racks, storage racks and display racks.

Thus, one objective of the current invention is to provide a durable, simple and highly versatile rack system that fits a variety of sized objects without requiring a user to perform adjustments to a clamping mechanism while fitting said various sized objects.

A further objective of the current invention is to provide a rack system that avoids damaging objects held within the vice faces by providing flush contact between the vice face and the sides of the object via rotation of the vice faces along an axis.

A further objective of the current invention is to provide a vice system that is useful for transporting objects on the roof of a vehicle.

A further objective of the current invention is to provide a vice system that is useful for transporting objects on the sides or rear of a vehicle or on the sides of a motorcycle, bicycle or other similar transportation means.

A further objective of the current invention is to provide a vice system that is useful for storing or displaying objects on a wall of a house, garage or other similar structure.

A further objective of the current invention is to provide a vice system that is useful for displaying objects on a display rack such as those used in stores or used at trade shows.

Towards these and other ends, the vice comprises at least a pivoting vice face and a means of attaching said vice face to a structure such as a vehicle rack system, a wall mounting system or a display rack system. By way of the design of the vice face, a variety of objects will easily and snugly fit within the vice face without requiring user adjustment of the vice faces. When secured, said objects will not be able to move horizontally, diagonally nor vertically with respect to the vice faces. The vice faces are further provided with a locking means for preventing unauthorized removal of an object secured within the faces. Said means may be a padlock, keyed cam-lock, or other locking mechanism well known in the art.

DETAILED DESCRIPTION OF THE INVENTION

Figure 1:
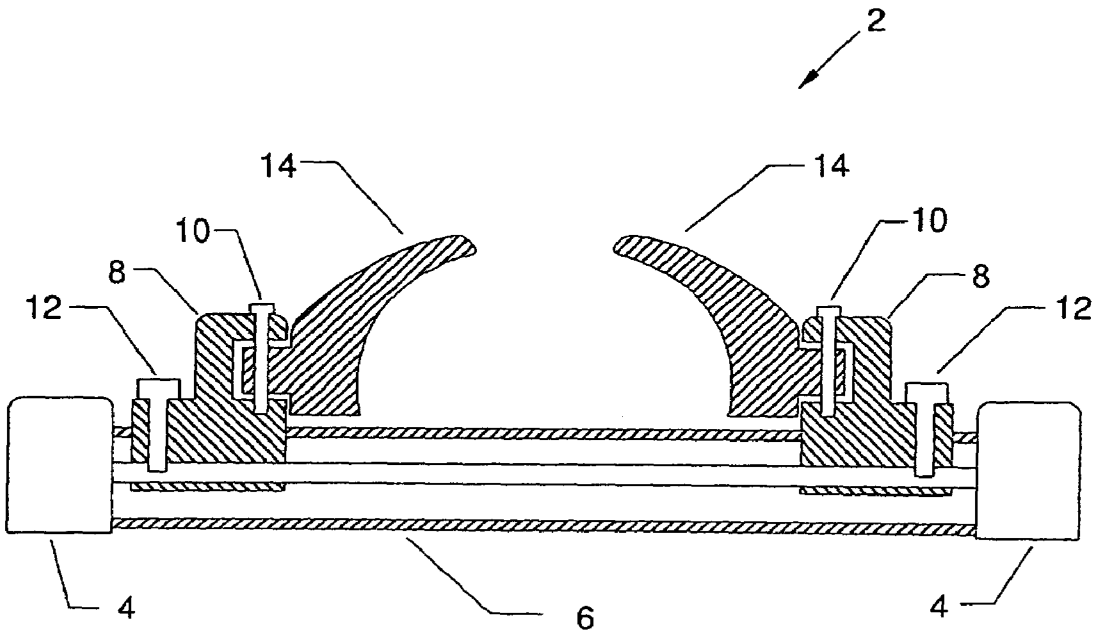
FIG. 1 is a side view of a mounting assembly.

Referring now to the drawings in greater detail, the invention vices 14 are shown in FIG. 1 in a preferred embodiment as used with a vehicle rack system 2 to support a surfboard or sailboard. Rack system 2 further comprises end supports 4 for attachment of the rack system to a surface, mounting bar 6, slide block 8, pivot pin 10, lock-nut 12, and vice 14.

Figure 2:
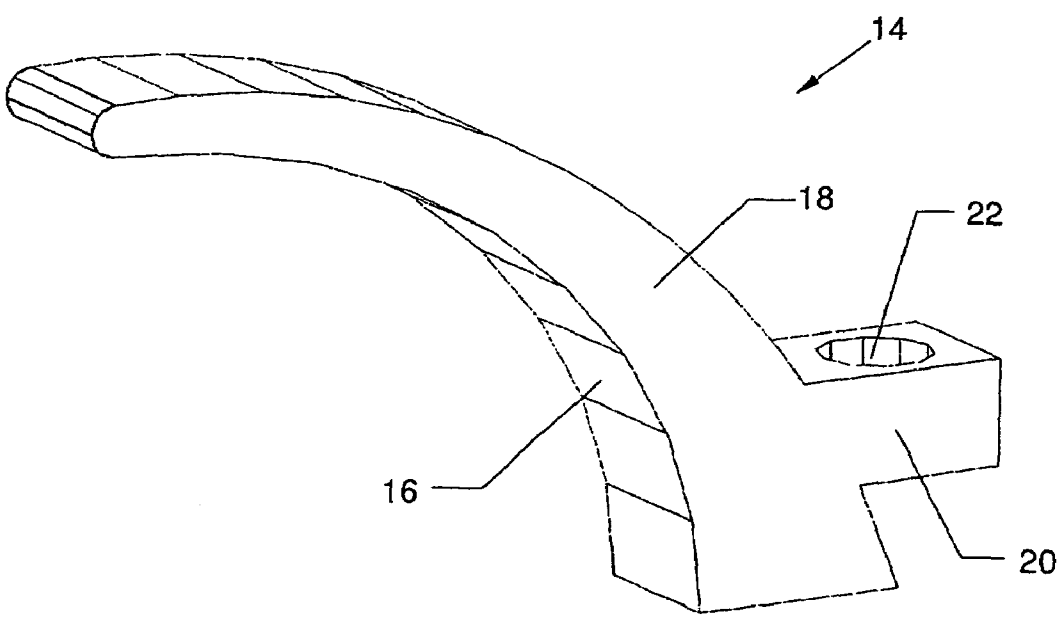
FIG. 2 is an isometric view of a vice highlighting the vice face.

In the preferred embodiment, vice 14, shown in greater detail in FIG. 2, comprises a vice face 16, a vice body 18, a tongue 20 and vice pivot shaft 22. Vice face 16 is preferably a curved shape with a radius from about 1-inch to about 18-inches. More preferably, the radius of vice face 16 is about 2-inches to about 10-inches. Most preferably, the radius of vice face 16 is about 3-inches to about 5-inches. In addition, the curve of vice face 16 measures preferably less than about 180 degrees. More preferably, the curve of vice face 16 measures less than about 90 degrees. Even more preferably, the curve of vice face 16 measures less than about 86 degrees. Most preferably, the curve of vice face 16 measures 85 degrees. Alternatively, the vice face 16 may be an ellipse preferably with a major axis ranging from about 18-inches to about 1-inch and a minor axis ranging from about 11.9-inches to about 0.6-inches; more preferably with a major axis ranging from about 10-inches to about 2-inches and a minor axis ranging from about 6.6-inches to about 1.5-inches; and most preferably with a major axis ranging from about 5-inches to about 3-inches and a minor axis ranging from about 3.3-inches to about 1.8-inches. One of ordinary skill in the art will readily employ a variety of shapes to achieve the spirit of the current invention.

The design of vice face 16 offers a structure that, when placed in direct contact with the sides of an object, such as the rails of a surfboard, will concomitantly provide sufficient contact with the rails and with the upper surface of the object preventing horizontal, diagonal and vertical movement of the object. By way of the design of the vice face 16, the contact point between said vice face 16 and the object is subject to a diagonal pressure, sufficient to prevent diagonal, vertical and horizontal movement with respect to the vice face 16.

Alternatively, the embodiment of the vice faces may have a non-curved design and still employ the principles of the current invention, such as but not limited to an angular shape. Furthermore, the size, radius, radians and/or angle of the vice 14 may change to accommodate the larger profiles seen in kayaks, canoes, travel mates, stacks of surfboards, snowboards, wind surfers or other objects. It is obvious to those of skill in the art to employ a variety of shapes and dimensions to a vice or other securing object to achieve the spirit of this disclosure.

In a still further embodiment, vice 14 is easily adjusted by the user to accommodate various sized objects. Because the current invention's design holds object in place using a single point contact, a wide range of sized objects are secured using a vice face of a single dimension. For example, a vice face 16 of the current invention designed with a radius of 4 inches readily secures objects as small as ½-inch (1.3 centimeters), as is common for snow boards and skim boards, all the way to 3½ inches, such as the standard surfboard on the market. By way of a telescoping or segmented vice body 18, the current invention can adjust linearly to bring the curved vice face in proximity to the contact point for a larger object, such as a wind surfer, generally having a 6 to 10 inch profile, or a kayak, generally having an 18 inch profile. By providing for a means to adjust linearly, the current invention is applicable to a wide range of sized objects without requiring a user to purchase a variety of vice faces. It is obvious to those of skill in the art to employ a variety of shapes and dimensions to a vice or other securing object to achieve the spirit of this disclosure. Those of ordinary skill in the art will readily provide means for relocating the vice faces of the current invention to meet the contact point of various sized objects.

Figure 3:
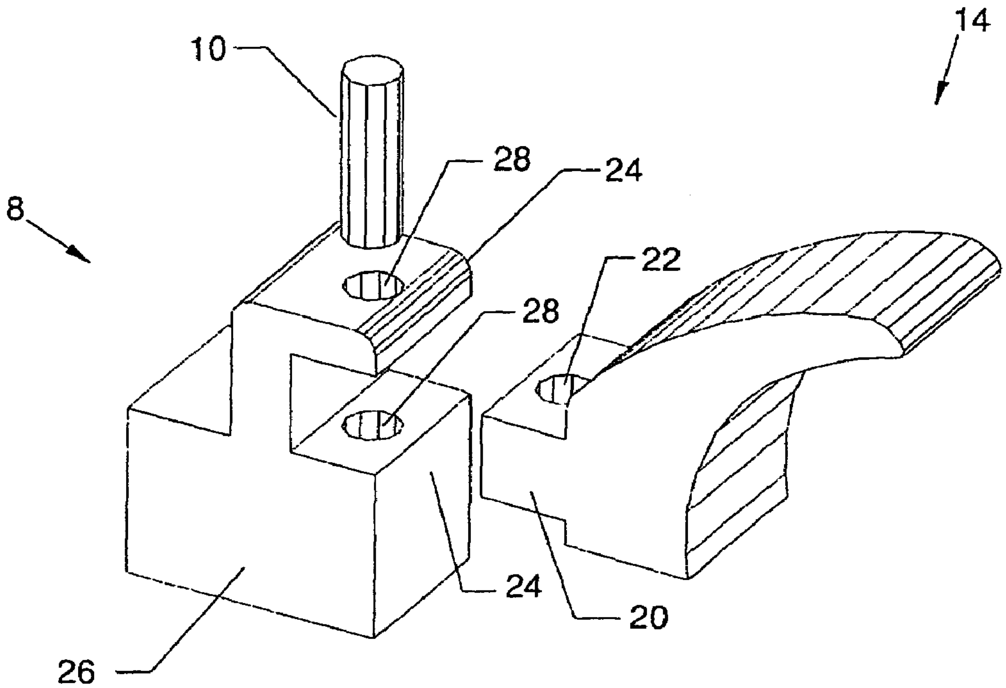
FIG. 3 is an isometric view of the slide block and vice comprising a tongue and groove pivoting means.

Vice face 16 is preferably integrated into vice body 18. Vice body 18 further comprises tongue 20 which in turn further comprises vice pivot shaft 22. In this embodiment, and as seen in FIG. 3, the vice 14 is such that it can form a pivoting tongue and groove relationship with a structure having arms 24 forming said groove and further comprising pivot shafts 28 within the arms. Preferably, slide block 8 is such a structure and in this embodiment comprises arms 24 extending from slide block body 26 to form a groove and further comprising arm pivot shafts 28. Alternatively, end support 4 may be such a structure, comprising arms 24 forming a groove and having pivot shafts 28. In a further embodiment, a fixed block forms such a structure wherein the fixed block is fixedly and permanently attached to mounting bar 6, and wherein the fixed block further comprises arms 24 to form a groove, said arms having pivot shafts 28. When used in conjunction with vice 14, tongue 20 fits between arms 24, and thus vice pivot shaft 22 aligns with arm pivot shafts 28. Pivot pin 10 is then inserted through vice pivot shaft 22 and arm pivot shafts 28 forming a pivoting point between the vice 14 and the slide block 8.

Figure 4:
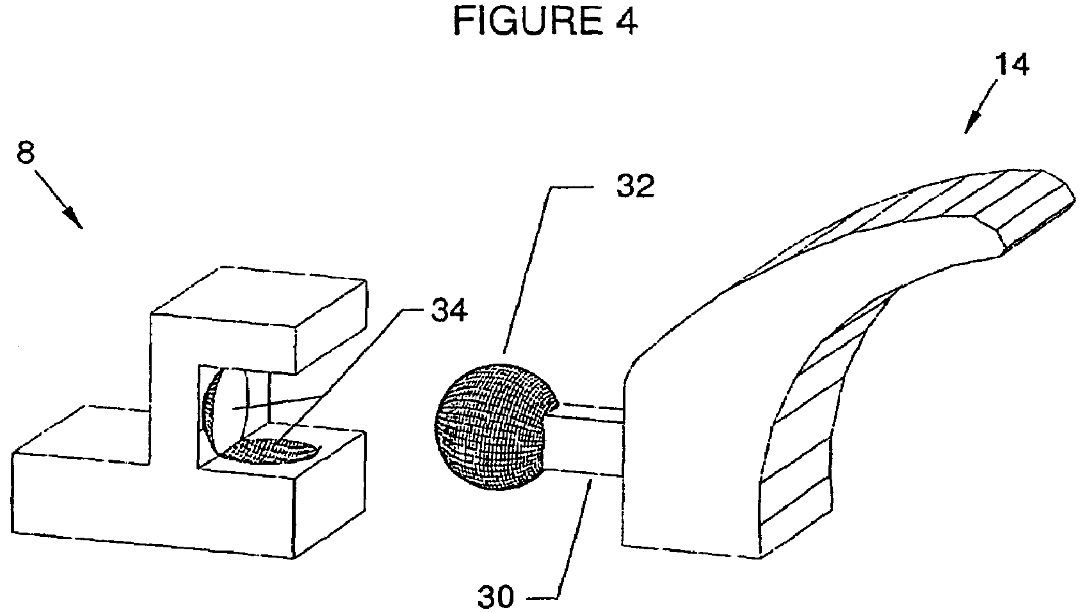
FIG. 4 is an isometric view of an alternative embodiment of the slide block and vice comprising a ball and socket pivoting means.

In an alternative embodiment, seen in FIG. 4, the pivot point between vice 14 and sliding block 8 are formed using a ball and socket arrangement. In such an embodiment an arm 30 and ball 32 extend from vice 14 and further fit into socket 34 housed within slide block 8 forming a pivot point between the vice 14 and the slide block 8.

Figure 5:
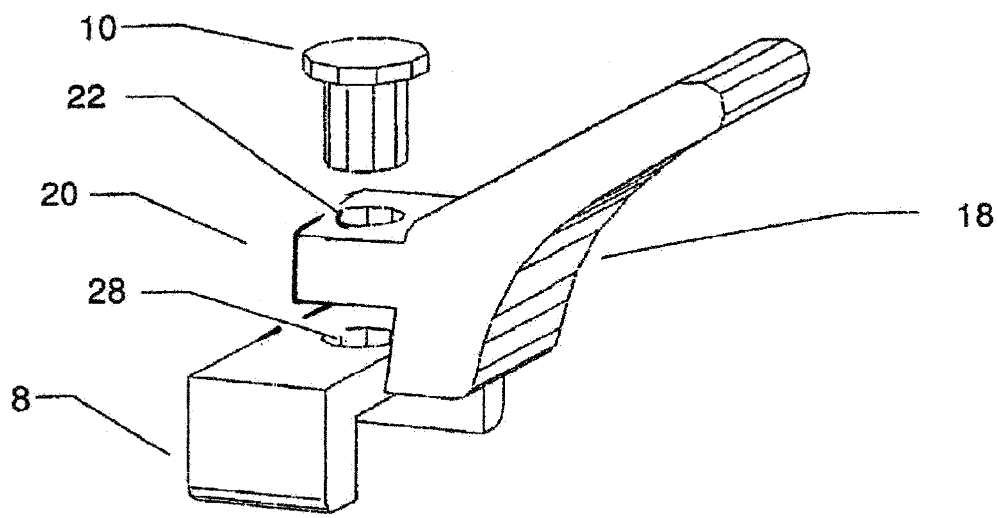
FIG. 5 is a view of an alternative embodiment of the slide block comprising a tongue member and vice comprising a platform member, both said members having a pivot shaft accepting a pivot pin to form a pivot means.

In a further alternative embodiment, as seen in FIG. 5, vice body 18 further comprises tongue 20 which in turn further comprises vice pivot shaft 22. A structure such as slide block 8, end support 4 or similar structure comprises pivot shaft 28. Pivot shaft 22 and pivot shaft 28 are aligned and pivot pin 10 is securely inserted through said pivot shafts thereby creating a pivot point between vice body 18 and the structure such as slide block 8, end support 4 or similar structure.

It is obvious to one of ordinary skill in the art to employ a variety of pivoting means to achieve the spirit of the above disclosure. Without being exhaustive, such means include but are not limited to hinges, ball bearings, and other obvious pivoting means. In addition, those of ordinary skill in the art will readily invert the placement of the pivoting means, for example, coupling the tongue or other structure with the slide mechanism and the groove or complementary structure with the vice.

Figure 6:
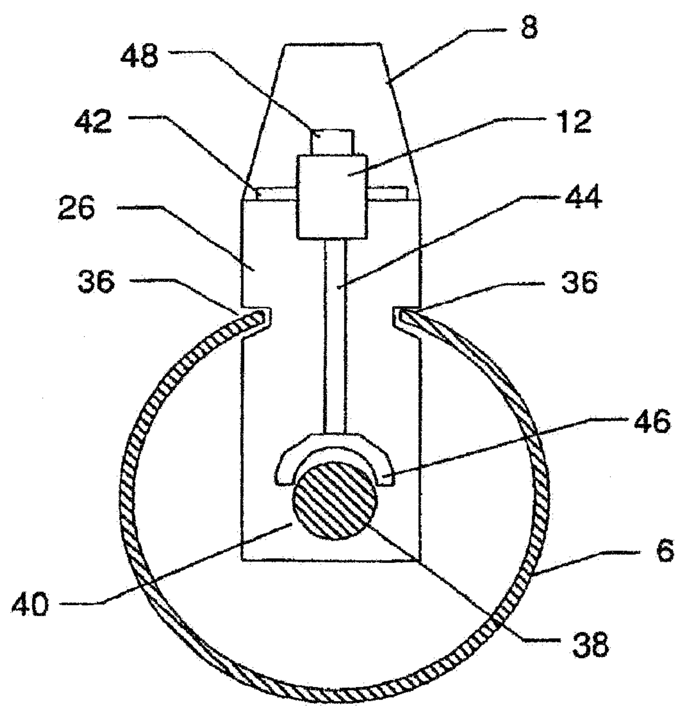
FIG. 6 is a cross section view highlighting the mounting bar, threaded rod, slide block and lock-nut.

In the preferred embodiment, slide block 8 is further coupled to a stable object, such as a vehicle rack mounting bar 6, as detailed in FIG. 6. Preferably, the mounting bar 6 is a hollow structure, comprising a longitudinal slot 36 and housing a threaded rod 38. It is obvious to those of ordinary skill in the art that the mounting bar 6 can be of any shape and design, including but not limited to round, square, and/or hexagonal. Slide block body 26 traverses longitudinal slot 36 and further comprises rod shaft 40. Threaded rod 38 runs through rod shaft 40, which is of a diameter sufficient to allow smooth passage of threaded rod 38 through rod shaft 40. Also on side block 8 and traversing longitudinal slot 36 is lock-nut 12. Lock-nut 12 further comprises push structure 42 coupled to push rod 44 coupled to half-nut 46. Half-nut 46 releasably engages with threaded rod 38 through the application of force to push structure 42. When engaged with threaded rod 38, half-nut 46 prevents any longitudinal movement of slide block 8 thus securely affixing slide block 8 in a user defined position along mounting bar 6. In addition, lock-nut 12 may further comprise a locking means 48 to prevent unauthorized release of half-nut 46 from threaded rod 38. Such locking means 48 are well known in the art to include but not be limited to, keyed cam-locks and pad locks.

Figure 7:
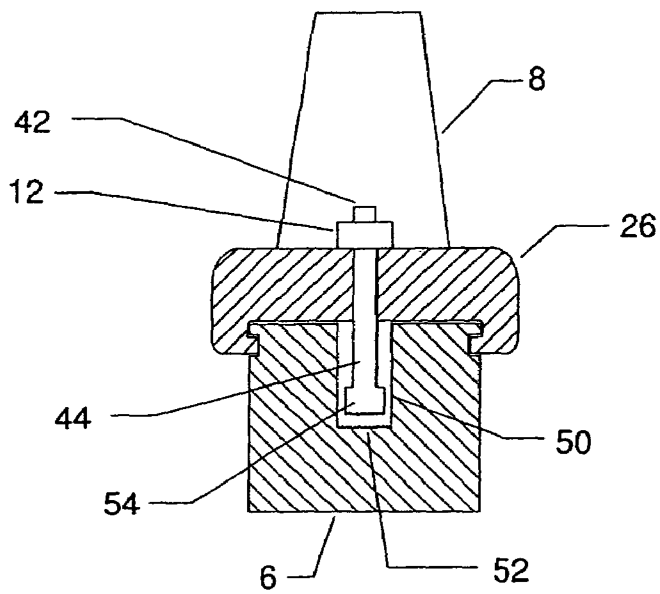
FIG. 7 is a cross section view of an alternative embodiment for a mounting bar, slide block and lock-nut.

In an alternative embodiment, shown in FIG. 7, mounting bar 6 comprises a channel 50 having a serrated channel surface 52. It is obvious to those of ordinary skill in the art that mounting bar 6 can comprise any rail-like shape and design without loosing the spirit of this disclosure. Slide block body 26 traverses the plane of the channel and comprises an optimally shaped foot 54 within the channel to provide and a means for securely affixing slide block 8 in a user defined position along mounting bar 6. Foot 54, further comprising a serrated surface, is similarly coupled to a push structure 42 and to a push rod 44, as described in the preferred embodiment. Foot 54 releasably engages with serrated channel surface 52 through the application of force to push structure 42. Engaging serrated channel surface 52 with the serrated surface of foot 54 prevents any longitudinal movement of slide block 8, thus securely affixing slide block 8 in a user defined position along mounting bar 6. In addition, slide block body 26 may further comprise a locking means 48 to prevent unauthorized release of foot 54 from serrated channel 52. Such locking means 48 are well known in the art to include but not be limited to, keyed cam-locks and pad locks.

Figure 8:
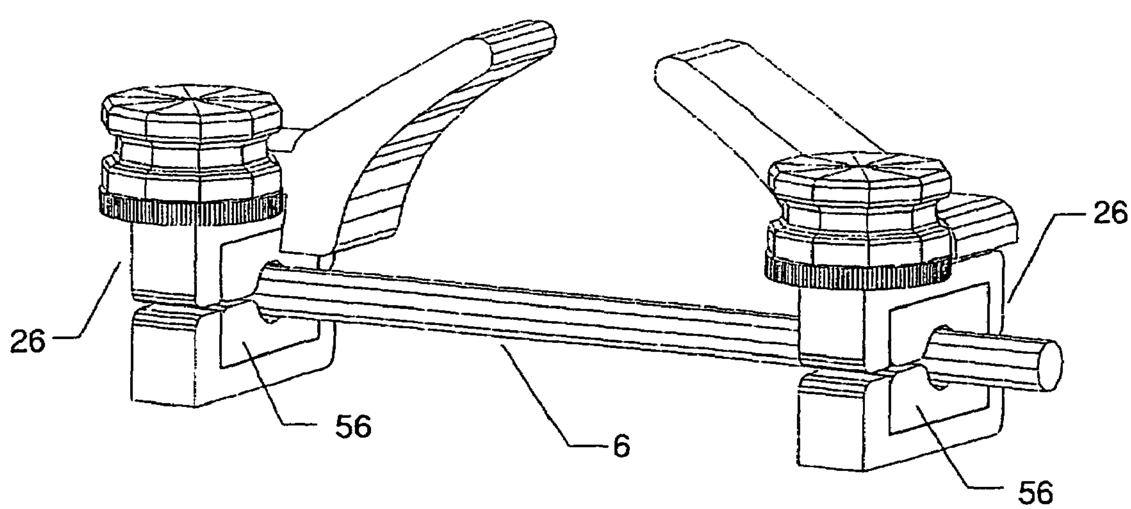
FIG. 8 is an alternative embodiment of the current invention comprising a means for adapting to a variety of commercial and custom rack devices.

In a further example embodiment shown in FIG. 8, slide body block 26 comprises a mounting bar attachment member 56 that is adaptable to a variety of standard member bars 6. In this embodiment, member bar 6 is any shape member bar, including those forming parts of racks systems currently available in the art, as well as those custom built by users. Here, slide body block 26 has an adaptable attachment member 56 that is preferably made of a material that is just malleable enough to form to a variety of shaped member bars 6; however, said material is rigid enough to not allow the slide body block 26 to slide along member bar 6 when the slide body block is configured to securely attach or clamp with member bar 6. Additionally, a locking means may be provided to lock slide body block 26 on to member bar 6. In a further example of this embodiment, the attachment member 56 can be an exchangeable piece having a custom cut out for attachment to a variety of commercial and custom racks' member bars.

It is obvious to those of ordinary skill in the art that a variety of means for securing a sliding member at a user defined position along a mounting bar are anticipated by this disclosure and will fall well within the spirit of this disclosure. It is also obvious to those of skill in the art, that the disclosed shape of said vice faces and the rotational aspect of the vice face to form full and flush contact with an object is applicable to numerous devices and is in no way limited to racks.

Figure 9:
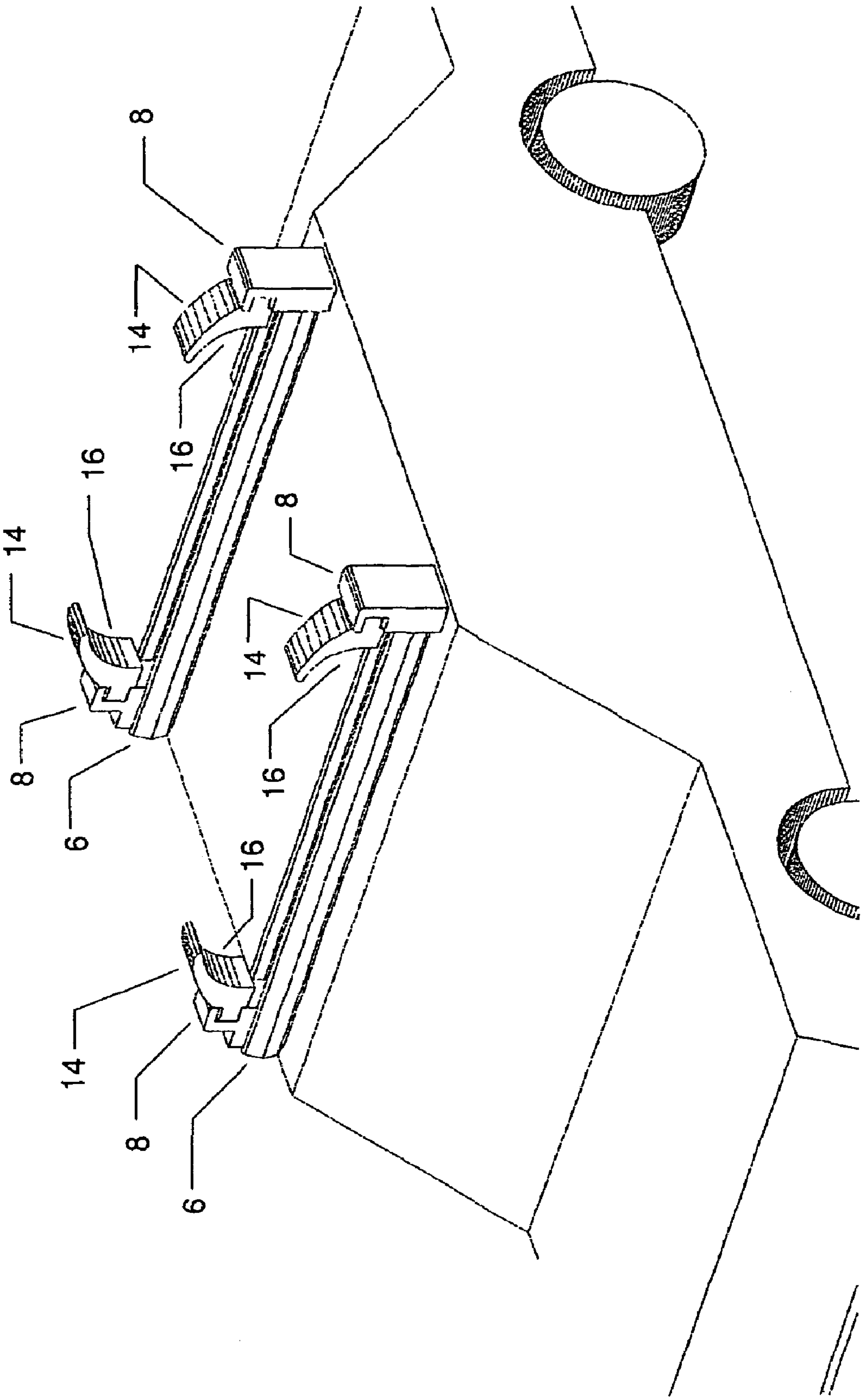
FIG. 9 is an example of the current invention employed as a roof top rack useful for transporting a surfboard on a vehicle.

FIG. 9 is a preferred embodiment for use of the current invention. The invention is horizontally mounted atop a vehicle for the purpose of transporting a surfboard. In this example, two mounting bars 6 are placed on the roof of a car sufficiently spaced apart along the longitudinal axis of the car. Each mounting bar further connects with two slide blocks 8 wherein the vices 14 of each slide block are positioned such that the vice faces 16 are capable of facing each other.

A user will select a position along the mounting bar for securely affixing one of the two slide blocks (first set) on each of said mounting bars. Ideally, but not necessarily, the each affixed slide block is fixed at a position on the respective mounting bar wherein the two slide blocks form a line running parallel with the vehicle's longitudinal center axis.

The slide blocks are then secured at a user defined position by engaging the slide blocks' lock-nut assembly with the threaded rod of the mounting bar. By applying pressure to the push structure located on the slide block, the half-nut forms contact with the threaded rod and the threads of both the inner surface of the half-nut and the threaded rod are interlaced. Interlacing said threads prevents further movement of the slide block along the threaded rod. The half-nut assembly is then locked into position using a keyed cam-lock, thereby preventing the unauthorized release of the slide blocks from its defined position along the mounting assembly.

Next, the user places the surfboard in contact with the vice faces associated with the affixed slide blocks. The slightest of pressure from the rails of the surfboard when in contact with the vice faces will cause the vices to pivot along the axis formed at the pivot point. Such rotation is in a plane parallel to the surface of the vehicle's roof, and places the entire vice faces in flush contact with the rails. Such full and flush contact is beneficial for avoiding damage caused by point contact on a rail.

The remaining two slide blocks (second set), one on each mounting bar, are relocated along their respective mounting bars until forming contact with the surfboard rail opposite the rail in contact with the first set. Again, the slightest pressure against the vice faces by the rails will rotate the vices along a plane parallel to the vehicle's roof surface placing the entire face of said vices in full and flush contact with the surfboard's rail. A user will then secure and the second set of slide blocks to the mounting bar by following the same procedure as stated for slide blocks set one.

When a surfboard is secured within a full set of vice assemblies according to this disclosed example, all horizontal, diagonal and vertical movement of the board is restricted. Horizontal movement traversing the longitudinal axis of the vehicle is prevented by the vices contacting the surfboard rails. Horizontal movement parallel to the longitudinal axis of the vehicle is prevented via the thickness of the board's beam. Vertical movement of the surfboard is prevented by the curve of the vice face.

It is obvious to those of ordinary skill in the art that such an application as disclosed in this example is generally applicable to any horizontal surface, and would fall well within the spirit of this invention.

Figure 10:
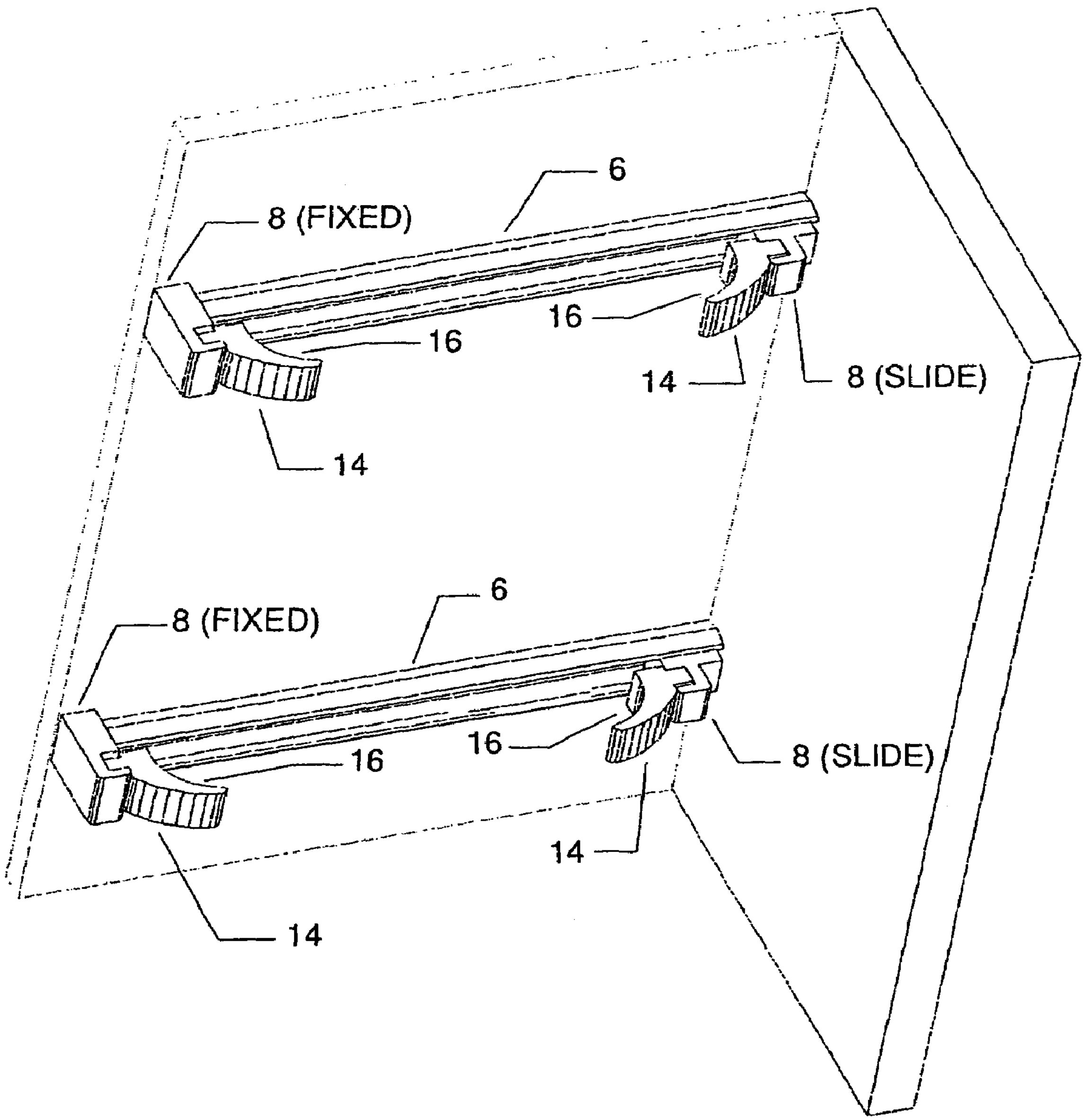
FIG. 10 is an example of the current invention employed as a wall mounted storage rack for storing a surfboard in a garage.

In another preferred embodiment, seen in FIG. 10, the disclosed invention is vertically mounted on a wall in a garage for the purpose of storing a surfboard. However, such an application is equally applicable to the vertical back end of a motor home, to the side of a motorcycle, or to any other vertical surface. Additionally, such an embodiment is applicable to diagonal and horizontal mounting, such as would be useful with a display rack, or from ceiling rafters. Those of skill in the art will readily apply the current invention to numerous surfaces for a variety of reasons, all within the spirit of the current invention. In this example, the alternative embodiment of the invention is disclosed wherein each mounting bar has a sliding block and a fixed block.

Two mounting bars, each containing a slide block and a fixed block wherein the vice faces are capable of facing each other, are placed vertically on a wall such that the mounting bars run parallel to the floor. Preferably, but not necessarily, the fixed blocks are in a position on the mounting bar closer the floor than are the slide blocks.

A surfboard is then placed on the rack with the rails contacting the vice faces associated with the fixed blocks. Such contact will rotate the vices along a plane parallel to the wall surface, placing the entire face of said vices in full and flush contact with the surfboard's rail. As mentioned above, such full and flush contact is beneficial to prevent the damage encountered through point contact.

The sliding blocks on each mounting bar are then relocated along the mounting bar to a location proximate the rail opposite that in contact with the fixed blocks' vice faces. Again, such contact will rotate the vices along a plane parallel to the wall surface, placing the entire face of said vices in full and flush contact with the surfboard's rail. A user will then secure the slide blocks to the mounting bar by following the same procedure as stated herein above.

When a surfboard is held within a full set of vice assemblies according to this disclosed example, all horizontal, diagonal and vertical movement of the board is restricted. Horizontal movement parallel the wall is prevented via the thickness of the board's beam. Horizontal movement perpendicular the wall is prevented by the curve of the vice face. Vertical movement is prevented by the vices contacting the surfboard rails.

What is claimed is:

1. A mounting assembly for securing a variety of objects to a mounting surface, comprising a plurality of vise bodies, at least one support member and a mounting bar, each vise body comprised of a curved vise face, a vise base, and a pivot means capable of articulating in a pivoting fashion with a support member, each vise base capable of pivoting on said support member in a plane parallel to said mounting surface, the vise face of each vise body shaped to readily fit a variety of objects when said objects are positioned between the vise bodies, the pivot means capable of moving the vise body, relative to a base and on a plane parallel to the attachment surface, to a position wherein the vise face of the vise body obtains flush contact with said objects, the vise face having a range of curve radii selected from the group consisting of: 1 inch to 18 inches, 2 inches to 10 inches, 3 inches to 5 inches, the pivot means selected from the group consisting of: a tongue and groove assembly having a shaft through said tongue and groove assembly to accept a shaft pin; a tongue and groove assembly having a ball and socket; a ball and socket; a tongue and groove assembly having a ball bearing; and a hinge each support member coupled with the mounting bar.

2. The mounting assembly of claim 1 wherein the support member is fixedly coupled with the mounting bar.

3. The mounting assembly recited in claim 1, wherein the support member is moveably coupled with the mounting bar.

4. The mounting assembly of claim 3, with a securing means for securing the support member at a desired proximity on the mounting bar.

5. The mounting assembly of claim 4 wherein the securing means is comprised of a support base selected from the group:

a support base further comprising a mounting bar compatible structure, a mounting bar further comprising a support base compatible structure, the mounting bar compatible structure releasably coupling to the support base compatible structure to secure the support base at a desired position along the mounting bar;

a support base further comprising a push structure coupled to a push rod coupled to a half-nut, a hollow mounting bar further comprising a longitudinal slot and internal threaded rod, the push rod traversing the longitudinal slot placing the half-nut in proximity to the threaded rod, and the half-nut releasably coupling to the threaded rod to secure the support base at a desired position along the mounting bar; and a support base further comprising a push structure coupled to a push rod coupled to a serrated end cap, a mounting bar further comprising a longitudinal channel having a serrated surface, the push rod traversing the longitudinal channel placing the serrated end cap in proximity to the serrated channel surface, and the serrated end cap releasably coupling to the serrated channel surface to secure the support base at a desired position along the mount bar.

6. The mounting assembly recited in claim 5, further comprising a means to lock the moveable support member at a desired proximity on the mounting bar.

7. A method for releasably attaching an object to a surface using the mounting assembly of claim 1, comprising the steps of:

fixing at least two sufficiently spaced apart mounting assemblies on a surface, engaging an object into the vise faces of the vise bodies attached to the support members on each of the mounting assemblies, causing rotation of said vise bodies with respect to the support bases to form flush contact between the vise faces and the engaged object, and releasably securing the support bases to the mounting bar to prevent any movement of the object.

8. The method recited in claim 7, wherein each mounting assembly is coupled with two support bases and vises.

9. The method recited in claim 7, wherein each mounting assembly is coupled with moveable support bases.

10. The method recited in claim 7, wherein each mounting assembly is coupled with one moveable support base and one fixed support base.

11. The method recited in claim 7, wherein one mounting assembly is coupled with fixed support bases and one mounting assembly is coupled with moveable support bases.

12. The method recited in claim 7, wherein one mounting assembly is coupled with fixed support bases and one mounting assembly is coupled with one moveable support base and one fixed support base.

13. The method recited in claim 7, further comprising a means to lock the releasably secured support bases at desired proximities on the mounting bars.

* * * * *